US012613513B2

(12) United States Patent
De Caigny et al.

(10) Patent No.: US 12,613,513 B2
(45) Date of Patent: Apr. 28, 2026

(54) INDUSTRIAL PLANT MONITORING

(71) Applicant: BASF SE, Ludwigshafen am Rhein (DE)

(72) Inventors: Jan De Caigny, Shanghai (CN); Daniel Engel, Ludwigshafen (DE); Sebastian Gau, Ludwigshafen (DE); Alexander Schaedler, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 595 days.

(21) Appl. No.: 18/012,266

(22) PCT Filed: Jun. 22, 2021

(86) PCT No.: PCT/EP2021/066925
§ 371 (c)(1),
(2) Date: Dec. 22, 2022

(87) PCT Pub. No.: WO2021/259901
PCT Pub. Date: Dec. 30, 2021

(65) Prior Publication Data
US 2023/0259105 A1 Aug. 17, 2023

(30) Foreign Application Priority Data
Jun. 25, 2020 (EP) ..................................... 20182313

(51) Int. Cl.
*G05B 19/418* (2006.01)
(52) U.S. Cl.
CPC .................. *G05B 19/41865* (2013.01); *G05B 2219/31481* (2013.01)

(58) Field of Classification Search
CPC .... G05B 19/41865; G05B 2219/31481; G05B 19/0425; Y02P 90/80
See application file for complete search history.

(56) References Cited

U.S. PATENT DOCUMENTS 10,721,508 B2 * 7/2020 Major ................ H04N 21/4621
10,990,521 B1 * 4/2021 Hwang ............... G06F 12/0215
(Continued)

FOREIGN PATENT DOCUMENTS

JP 2016522517 A 7/2016
JP 2018110374 A 7/2018

OTHER PUBLICATIONS

1 Written Opinion and International Search Report for PCT/EP2021/066925 mailed Oct. 5, 2021, 11 pages.

*Primary Examiner* — Thomas C Lee
*Assistant Examiner* — Tyler Dean Hedrick
(74) *Attorney, Agent, or Firm* — Lowenstein Sandler LLP

(57) ABSTRACT

The present invention provides a medical device securement system (10) for releasably anchoring a medical device (C) such as a catheter hub to the skin of a patient. The system (10) comprises a main body having a first section (14) and a second section (16) displaceable relative to one another to translate the system between an undeployed and a deployed state, a skin adhering element in the form of microneedle arrays projecting from a tissue contacting surface of the first section (14) and a second array of microneedles projecting from a tissue contacting surface of the second section (16), a retention device (24) provided on the main body for receiving and engaging the medical device (C), wherein the first section (14) comprises a first base defining the tissue contacting surface and a closure member (20) hingedly articulated relative to the first base.

14 Claims, 2 Drawing Sheets

(56)                References Cited

U.S. PATENT DOCUMENTS

| 2004/0093154 | A1* | 5/2004 | Simonds | ............ | B60R 16/0315 |
| | | | | | 701/532 |
| 2005/0038658 | A1* | 2/2005 | Sladden | ............. | H04L 41/0266 |
| | | | | | 704/270.1 |
| 2016/0274552 | A1* | 9/2016 | Strohmenger | ......... | G06Q 10/06 |
| 2018/0041470 | A1* | 2/2018 | Schultz | .................. | H04L 47/24 |
| 2019/0188781 | A1* | 6/2019 | O'Brien | ............ | G06Q 30/0643 |

* cited by examiner

INDUSTRIAL PLANT MONITORING

CROSS-REFERENCE TO RELATED APPLICATION SECTIONS

The present application is a national stage entry under 35 U.S.C. § 371 of International Application No. PCT/EP2021/066925, filed on Jun. 22, 2021, which claims priority to European Patent Application No. 20182313.5, filed on Jun. 25, 2020, the contents of which are hereby incorporated by reference in their entirety.

TECHNICAL FIELD

The present teachings relate generally to computer-based monitoring and/or optimization of an industrial plant.

BACKGROUND ART

Industrial plants such as process plants comprise equipment that is operated to produce one or more industrial products. The equipment may, for example, be machinery and/or heat exchangers that require monitoring and maintenance. A requirement for maintenance can depend on several factors that include operation time and/or load on the equipment, environmental conditions that the equipment has been exposed to, and so forth. Undue or unplanned shutdown of the equipment is generally not desired as it often results in a stoppage of production, which can reduce the efficiency of the plant and can cause wastage. Since the time period between two maintenances can vary, it may be difficult to plan the shutdown of the equipment around the time when the maintenance is actually necessary. Additionally, safety is of high importance in industrial plants. In order to prevent unsafe conditions from occurring, different equipment or parts of the plant may be monitored.

For example, an industrial plant such as a chemical plant may comprise equipment such as reactors, storage tanks, heat exchangers, compressors, valves, etc., which are monitored using sensors. At least some of the equipment may be monitored and/or controlled for producing the one or more industrial products. The monitoring and/or controlling may even be done for optimizing the production of the one or more products.

An industrial plant typically comprises a plurality of sensors which are distributed in the plant for monitoring and/or controlling purposes. Such sensors may generate a large amount of data. As such, production, such as chemical production, can be a data heavy environment. However, presently the gain from such data from multiple data sources to increase production efficiency in one or more plants has not been fully leveraged.

Furthermore, the data sources such as sensors may sometimes be distributed or located remotely over multiple sites. In some cases, a site may be located in another city or even another country from one or more other sites. As it may be appreciated, it can be challenging to leverage data from remotely located one or more data sources.

Applying new technologies in cloud computing and big data analytics is of great interest in industrial plants. Unlike some other manufacturing industries, process industry can be subject to higher security standards. For this reason, computing infrastructures are typically siloed with highly restrictive access to monitoring and control systems. Due to such security standards, latency and availability considerations can contravene a simple migration of embedded control systems to e.g., a cloud computing system. Bridging the gap between highly proprietary industrial manufacturing systems and cloud technologies is thus one of the challenges in the process industry.

There is thus a requirement for a method for monitoring and/or analyzing data from an industrial plant which can allow a scalable and flexible integration of data from distributed data sources.

SUMMARY

At least some of the problems inherent to the prior-art will be shown solved by the subject-matter of the accompanying independent claims.

When viewed from a first perspective there can be provided a method for integrating asset data from an industrial asset located within an industrial plant, the asset being communicatively coupled to a first processing layer, wherein the asset data is provided to a second processing layer via the first processing layer; the first processing layer being communicatively coupled to the second processing layer, and wherein the first processing layer and the second processing layer are configured in a secure network, the method comprising:

generating, at the second processing layer, technical context data related to the asset;

providing, via the second processing layer, the technical context data to an interface to an external network; wherein the technical context data comprises one or more accessibility criterion for the asset data; the accessibility criterion comprising one or more rules and/or parameters compliable by an external processing layer for receiving the asset data.

The method for integrating asset data as expressed above can also be understood as a method for data integration of the asset data, or even as a method for monitoring and/or analyzing at least a portion of asset data, wherein the asset data has been generated via an industrial asset within the industrial plant; the asset being communicatively coupled to a first processing layer, and wherein the at least a portion of asset data is provided to a second processing layer via the first processing layer; the first processing layer being communicatively coupled to the second processing layer, and wherein the first processing layer and the second processing layer are configured in a secure network.

The proposed teachings can allow for a more efficient data handling via the second processing layer. There can be even provided a seamless data access in different processing layers and cloud connectivity. The present teachings can bridge the gap between operational technology and information technology in the highly advanced process industry environment. By aggregating contextualized data in a separate layer, the availability and performance of the first layer is not affected. Moreover, data exchange may be allowed with an external processing layer outside the secure network while adhering to high security standards in chemical industry. By introducing different process and storage system layers and communicatively coupling them, the mass data transfer and handling can be distributed over different layers allowing for more flexibility in contextualization, storage and access for process application. In some cases, even multiple industrial plants can be accommodated via the second processing layer. Hence a highly scalable, more reliable and more enhanced monitoring and/or controlling of industrial plant(s) can be achieved. This way even new technologies like serverless IaaS/PaaS/SaaS can be integrated into the production environment allowing for continuous application delivery and deployment. It will be appreciated that there may even be one or more further processing layers in addition to the first and second processing layers. They may even be one or more additional processing layers between the first and the second processing layer.

The present teachings can also allow for a more flexible handling of process applications. For instance, the deployment of process applications ingesting plant or asset data can be streamlined for multiple assets even in multiple plants. Additionally, depending on the specific data required by the process application and the computing resources required to run such application, an appropriate processing layer may be chosen, thus adhering to high availability standards in certain industrial plants such as chemical plants. For instance, computationally heavy process applications that require ingesting plant specific data may be executed on the second processing layer, while process applications that require ingesting asset data and requiring low latency may be executed on the first processing layer.

In industrial plants such as chemical production plants, a plurality of distributed data sources can exist. Some of these data sources or assets may also be distributed globally. Usually, said assets provide data that may be stored in a system or database such as a Plant Information Management System ("PIMS"). It is also usual for plants to have a supervisory control and data acquisition ("SCADA") system. PIMS may either be a part of SCADA or they may be different systems. In this disclosure, when referring to the term PIMS, the alternative where PIMS and SCADA are the same system is to also be assumed included in the ambit of the term PIMS. Similarly, for the case that these are two different systems, the data may be transferred to either one or both, so those alternatives are also to be understood lying within the scope of the term. In some cases, the data source or asset may contain or produce more data than that it is provided to the SCADA or PIMS. Thus, the internal data of the data source may be more extensive than the data which are transmitted to, and/or stored in, the PIMS. For data analytics such data internal to an asset, or asset data, may be valuable. For example, a variation in the internal data may be normal for the asset itself, but it may cause or indicate an important effect in another part of the plant which may not be apparent just by observing the internal data alone, and/or by observing the output data provided to the PIMS alone. Moreover, if a similar asset is operating in another plant, the data from the similar asset may be usable for optimization of one or more such assets in other plants as well. Optimization in this sense may mean any one or more of: training of a machine learning model, monitoring output signal, deriving one or more control- or monitoring set-points, and such functions. The data from one asset can hence be leveraged to optimize other similar assets. For process analyses it may thus be valuable to integrate asset data from different processing layers and/or assets.

For performing data analysis on data including the asset data, a user operatively connected to the external processing layer may require defining data analytics. The user may either be a person who is responsible for performing the data analysis via the external processing layer or another computer processor at which data from the external layer can be provided, or the user may be the another computer processor itself which is used for automatically running the data analysis using data analytics. The user may even be the external processing layer itself with capability to run the data analysis. Henceforth the term "user" will be used to refer to any of the above definitions or any of their combination.

The user may be unaware of the technical state of the assets within the industrial plant. The industrial assets of, or within the plant, or more generally henceforth called assets, and network infrastructure of the plant is usually a secure environment with no or limited access to data of the plant to the external of the plant. The user with suitable access rights may be provided an access to the asset data generated by one or more assets in the plant, however the user may still lack information regarding other operative parameters within the plant network. Such operative parameters may include resource utilization such as network load within the plant internal infrastructure, central processing unit ("CPU") and/or controller load, memory utilization and power usage etc. In certain cases, user requests may overload at least a part of the plant infrastructure. For example, when the user requests an access to or a transfer of asset data while critical plant operations require some of the same resources within the plant. Especially if the request is resource intensive, the performance of the critical plant operations may be affected due to the processing of the request. In a worse-case scenario, the plant infrastructure may collapse due to the resource demanding nature of the user request. The plant safety and/or efficiency may thus be compromised. To prevent this, the present teachings propose generating technical context data related to the asset at the second processing layer. The technical context data can then be provided via the interface to an external network, from where it can, for example, be provided to the external processing layer from which the asset data may be requested. By mediating the request via the second processing layer, it can be prevented that the first processing layer becomes overloaded.

According to an aspect, the technical context data is at least partially generated using at least one of the a priori determined parameters including asset network address, asset CPU load, asset memory such as Random Access Memory ("RAM"), and at least a part of the network path between the asset and the user. More generally, the a priori determined parameters can be any one or more properties of one or more of the computational- and/or network resources between the asset and the user. Such parameters are preferably indicative of the physical limitations of one or more of the computational- and/or network resources between the asset and the user, e.g., available memory, network capacity, processing power, etc. The a priori parameters may either be determined from current operating conditions of one or more of the resources, or they may be determined from one or more past accesses and/or transfers of the data from or around the asset.

According to an aspect, the a priori determined parameter is indicative of a temporal network load value, for example between the asset and the user, or between any part of the network that is determinant to the network capacity for transferring and/or accessing the asset data from the asset to the external processing layer or user. For example: on almost every workday morning, the network load may increase due to employees accessing the on-site or plant network essentially simultaneously. In such high resource demanding periods, the network may thus be highly loaded for example, due to a large number of computers starting up within a short period of time from each another and launching of applications that require network access. Due to excessive load, it is possible that the network breaks-down. In such periods, the transfer and/or access of the asset data may either suffer from low throughput or even break down either intermittently or completely. Hence, data analytics that have been based on the asset data may also be affected. It is even possible that additional load due to the transfer and/or access of the asset data contributes to or results in the collapse of the network and/or computational resources. Thus, the temporal network load value, indicative of the estimated or computed network capacity at a given time, may be at least one of the priori determined parameters based on which the technical context data is at least partially generated. This can be used, for example, to prevent or prioritize appropriately the transfer and/or access of the asset data from the asset to the user. The reliability of remote data analytics that require the asset data can thus be improved, and in some cased even the efficiency of such analytics can be increased by minimizing the time within with the asset data is transferred. With this and even other aspects of the teachings, the analytics can thus be prioritized and optimized as per one or more of the resource capacities.

Additionally, or alternatively, the technical context data may at least partially be generated using at least one iterative parameter. The iterative parameter may be determined via the second processing layer by analyzing a response to a partial request, the response being indicative of the impact of the partial request on the plant performance. The iterative parameter may, for example, be determined by analyzing or measuring the response. The response may be indicative of the impact of the partial request on of the one or more resources that are critical to operation and/or efficiency and/or safety of the asset and/or any of the assets of the plant. For example, the impact may be estimated by analyzing the response in terms a latency value in response to the partial request.

Additionally, or alternatively, the response may even be calculated using a change in processing load and/or memory and/or network load. The processing load and/or memory may be measured at any one or more of the assets in the plant, especially one or more critical assets. The partial request may be generated by the second processing layer for accessing data from the asset. The partial request may comprise a request for a subset of the asset data from the asset. The subset of the asset data may either be a part of the data being requested by the external layer or user, or it may be a test data just for the purpose of assessing resource capability. In any case, the partial request is a fail-safe request generated by the second processing layer such that any detriment to the plant performance is not likely to cause a real reduction in plant safety, and preferably also efficiency. In other words, the partial request can cause only a short-term change in the plant behavior which is not enough to cause a meaningful, practical or significant reduction in plant safety. Accordingly, the subset asset data or test data is a small dataset which is essentially just sufficient or resource demanding so as to be able to analyze the response. The at least one iterative parameter can thus be used for generating the technical context data. As previously disclosed, the at least one iterative parameter can thus be used for defining of the one or more accessibility criterion. The at least one iterative parameter is, therefore, indicative of the resource allocation for the external layer in receiving the asset data. It will be appreciated that the resource allocation can be for any one or more of the computational- and/or network resources between the asset and the user.

Or more specifically, the method also comprises:
 generating, via the second processing layer, a partial request for accessing data from the asset or the asset data;
 measuring a response to the partial request; the response being indicative of the impact of the partial request on one or more computational and/or network resources;

determining, dependent upon the response, at least one iterative parameter; wherein
 the technical context data is at least partially generated using the at least one iterative parameter.

According to a further aspect, the second processing unit may even generate a second partial request in response to measuring the response to the partial request. The second partial request may be more resource demanding, for one or more resources, as compared to the partial request. Accordingly, the iterative parameter may be determined via the second processing layer by measuring a second response to the second partial request. In cases when the response to partial request does not indicate a large enough or substantial detrimental impact of the partial request on of the one or more resources, the second partial request may be generated, the second partial request being more resource demanding that the partial request.

The at least one iterative parameter may then be generated by measuring the response to the second partial request. In some cases, any one or more of the iterative parameters determined from the partial request and any one or more of the iterative parameters determined from the second partial request may be included in the at least one iterative parameter, such that iterative parameters from each of the partial requests are used for defining of the one or more accessibility criterion. By doing this, the user or the external processing layer may adapt the transfer and/or access of the asset data for example if transfer from multiple assets in the plant is required. The data transfer and/or access of the asset data can thus be made more intelligent by managing requests for multiple assets. The second processing layer can then get a more precise determination of one or more resource bottlenecks for providing data transfer and/or access of the asset data to the external layer. For example, for catering requests for asset data from multiple assets, the resource capacity of one or more resources required for meeting the requests can be distributed in such a way that best transfer and/or access parameters can be provided for the overall data transfer.

The distribution of resource capacity may be done based on the any one or more of the iterative parameters determined from the partial request and the any one or more of the iterative parameters determined from the second partial request. The respective responses from the partial request and the second partial request can provide a measure of resource allocation needed for each kind of request. This can be used to allocate capacity from one request to another in cases where data from multiple assets needs to be accessed at or around the same time. In any case, the process of determining the at least one iterative parameter may be repeated by in incrementally adapting the partial requests such that the second processing layer can iteratively determine the at least one iterative parameter. There can thus be one or more further partial requests, i.e., more than two partial requests for determining resource capacities associated with different resource demands. This can be used not only to maximize the resource allocation for accommodating the request from the external processing layer whilst ensuring that sufficient resource capacity remains for plant operations, but can also help the second processing layer and/or the external processing layer in some cases as discussed above in proactively adapting the requests for asset data especially from multiple assets.

Or more specifically, the method also comprises:
 generating dependent upon the response, via the second processing layer, a second partial request for accessing the asset data; wherein the second partial request is more resource demanding that the partial request;

measuring a second response to the second partial request; the second response being indicative of the impact of the second partial request on one or more computational and/or network resources;

determining, dependent upon the response and/or the second response, at least one iterative parameter; wherein the technical context data is at least partially generated using the at least one iterative parameter.

Thus, combining both aspects, the method comprises:

generating, via the second processing layer, a partial request for accessing data from the asset or the asset data;

measuring a response to the partial request; the response being indicative of the impact of the partial request on one or more computational and/or network resources;

generating dependent upon the response, via the second processing layer, a second partial request for accessing data from the asset or the asset data; wherein the second partial request is more resource demanding that the partial request;

measuring a second response to the second partial request; the second response being indicative of the impact of the second partial request on one or more computational and/or network resources;

determining, dependent upon the response and/or the second response, at least one iterative parameter; wherein the technical context data is at least partially generated using the at least one iterative parameter.

As explained, the data from the asset can either be a subset of the asset data or it may be test data.

As discussed, the technical context data comprises one or more accessibility criterion for accessing the asset data. The accessibility criterion may comprise one or more rules that must be complied by the external processing layer to be able to access or receive the asset data. Alternatively, or in addition, the accessibility criterion may also comprise one or more parameters that the transfer and/or access of the asset data should have or be compliable with.

It will be appreciated that the one or more rules and/or parameters, included in the accessibility criterion, are automatically specified or selected such that an access and/or transfer of the asset data to the external transfer layer performed in compliance with said one or more rules and/or parameters does not affect any critical operation of the plant and/or any of the assets. In other words, by specifying the compliable one or more rules and/or parameters, it can be prevented that any important plant or asset operation is detrimentally impacted as a result of the access and/or transfer of the asset data to the external processing layer. A critical operation can be any operation or operating mode of the asset, a group of assets, or the plant as whole, which when affected can result in reduction in safety and/or, efficiency and/or reliability of the plant and/or any of the assets related to the plant. It can be said that any critical operation of the plant is not affected due to an access and/or transfer of the asset data being performed using the one or more rules and/or parameters.

Thus, the technical context data comprises one or more accessibility criterion for the asset data; the accessibility criterion comprising one or more rules and/or parameters compliable by an external processing layer for receiving the asset data such that any critical operation of the plant is not affected.

Furthermore, it can also be achieved that, for the asset data to be accessed or transferred, the user does not require to be aware of the operational or resource conditions at least within the plant. The second processing layer can thus automatically adapt the accessibility conditions for access and/or transfer of the asset data according to the plant conditions. Plant safety can thus be improved. Furthermore, it can be prevented that sensitive information regarding operational and/or resource conditions are required to leave the plant secure network. For example, the external layer does not need to know the plant operation parameters. Rather, the second processing layer can specify the one or more rules and/or parameters and provide the same to the external processing layer such that the external processing layer is only aware of the one or more accessibility criterion according to which the asset data may be accessed and/or transmitted to the external processing layer.

It is also possible that in certain cases, data transfer and/or access with a given characteristic, e.g., data rate, is not possible via a given network path. For example, the user may require a data rate higher than a given value for a performing an analysis, which data rate may not be possible to achieve due to limitations of the infrastructure. Such a limitation can for example be latency, which can limit total data throughput by affecting the bandwidth-delay product of the data link between the asset and the user. Thus, in some cases, the accessibility criterion or criteria provided to the external processing layer by the second processing layer can be used by the user to request data transfer and/or access according to any of the valid criterion or criteria from the accessibility criterion or criteria provided. In some cases, the accessibility criterion or criteria may be provided to the external processing layer after receiving a request for access and/or transfer at the second processing layer. The request may be initiated by the user. In some cases, the request may include one or more data transfer and/or access characteristic required by the user. In case said characteristics can be accommodated by the plant infrastructure and/or operating conditions, the accessibility criterion or criteria provided to the external processing layer by the second processing layer may include the one or more data transfer and/or access characteristic required by the user. If one or more better access characteristics than the one or more of those requested by the user are possible, those better characteristics can be included in the accessibility criterion or criteria provided to the external processing layer. The external processing layer may then decide whether to select a better data transfer and/or access characteristic from the accessibility criteria. In other cases, the accessibility criterion or criteria provided to the external processing layer by the second processing layer may just have the one or more data transfer and/or access characteristic requested by the user. This can be the case, for example when the user request can be accommodated without affecting the critical plant operations or functions.

In some cases, the technical context data may even comprise one or more performance parameters, such as a latency value or an estimate thereof, between the asset and the user. The latency value may either be provided for a complete network path between the asset and the user, or for a portion of the network path. For example, in certain cases, an overall latency value may be dominated by a portion of the network, or a bottleneck in the network path. In some cases, providing in the technical context data the latency value just for that network portion or the bottleneck may be sufficient.

In some cases, the second layer may also apply additional contextualization to the asset data. The additional contextualization may relate to context available on the second processing layer. Via contextualization context such as plant identifier, plant type, reliability indicator, or alarm limits for the industrial plant may be added to the asset data. Additionally, or alternatively, in some cases, even a technical asset structure of one or more plant(s), a Verbund site, other asset management structure (e.g. asset network), or application context (e.g. model identifier, third party exchange) may be added to the asset data. Such overarching context can originate from functional locations or digital twins, such as digital piping and instrumentation diagrams, 3D models or scans with 3-dimensional coordinates of the plant assets. Additionally, or alternatively, local scans from mobile devices linked to e.g. piping and instrumentation diagrams may be used for contextualization.

The process of contextualization refers to linking data points available in one or more storage unit(s). Such unit(s) may be persistent or non-volatile storage. Data points may relate to measurement values or context information. At least one of the storage unit(s) may be a part of the first processing layer. Additionally, or alternatively, at least one of the storage unit(s) may be a part of the second processing layer. Additionally, or alternatively, at least one of the storage unit(s) may be a part of the external processing layer. The storage units may even be distributed across two or more of the processing layers. The linking may be generated dynamically or statically. For example, pre-defined or dynamically generated scripts may generate dynamic or static links between information data points in one processing layer or across multiple processing layers. Links may be established by generating a new data object including the linked data itself and storing such new data object in a new instance. Any data point stored may be actively deleted, if a copy is stored elsewhere. Any data point thus copied from one storage unit to a new data object in the same or another storage unit may be deleted to reduce storage space. Additionally, or alternatively links may be established by generating a meta data object with embedded links to address or access respective data points in distributed storage unit(s). Any data point thus addressable or accessible through the meta data object may remain in its original storage unit. Linking such information to form a new data object may still be performed e.g. on the external processing layer. For the retrieval of data either data objects are accessed directly or meta data objects are used to address or access the data distributed in one or more storage unit(s). Any operations on such data such as applications may either access such data directly, may access a non-persistent image of such data, e.g. from cache memory, or a persistent copy of the data.

According to an aspect, the first processing layer is associated only with a single plant, i.e., only the industrial plant. The first processing layer may thus be a core process system including one or more processing devices and storage devices. Such layer may include one or more distributed processing and storage devices forming a programmable logic controller ("PLC") system and/or distributed control system ("DCS") with control loops distributed throughout the plant. Preferably the first processing layer is configured to control and/or monitor chemical processes and assets on the asset level. Hence the first processing is communicatively coupled to the asset. The first processing layer may also monitor and/or control the chemical plant on the lowest level. Furthermore, the first processing layer may be configured to monitor and control critical assets. Additionally, or alternatively, the first processing layer is configured to provide asset data to the second processing layer. The first processing layer may even be configured to provide process data to the second processing layer. The asset data and/or process data may be provided directly or indirectly to the second processing layer.

The second processing layer may be associated with just the industrial plant, or it may be associated with more than one plants, for example a group of plants, or a Verbund. The second processing layer may include a process management system with one or more processing and storage devices. According to an aspect, the second processing layer is configured to manage data transfer to and/or from the first processing layer. The second processing layer may even host and/or orchestrate process applications. Such process applications may monitor and/or control one or more chemical plant(s) or one or more asset(s). The process management system may be associated with one or more industrial plants.

In a further aspect the second processing layer may comprise an intermediate processing layer, or intermediate processing system, and optionally a process management system. The intermediate processing layer may be communicatively coupled to the first processing layer. In this case, the first processing layer and the process management system may be coupled via the intermediate processing system. The intermediate processing system may be configured to collect process or asset data provided by the first processing layer. The process management system may be configured to provide plant specific data of one or more plant(s) to the interface to the external network. The intermediate processing system may be associated with one or more industrial plants. By including the intermediate processing level to the second processing layer adds a further security layer. It can detangle the sensitive first processing layer from any external network access. Additionally, the intermediate level can allow for more enhanced data handling by reducing data transfer rates to the external processing layer via pre-processing and enhancing data quality by contextualization. For providing access and/or transfer of the asset data, load on the first processing layer due to the external processing layer can thus be reduced. In some cases, the intermediate processing layer may even be used for executing data analytics specified by the external processing layer. Especially in cases where a data intensive access and/or transfer to the external processing layer is difficult or impossible, asset data can still be leveraged by executing the analytics on the intermediate processing layer. The data analysis results from analyzing the asset data can then be transmitted to the user via the interface. The option of executing data analytics locally on the intermediate layer can be specified in the technical context data. In some cases, the intermediate layer may be used to cache data from at least the assets that have high data throughput. The intermediate layer being decoupled from the first processing layer can thus be used to better accommodate and cater resource intensive requests from the user without affecting the behavior of the first processing layer as a result of the external processing layer request. Plant safety and/or reliability can thus be further improved whilst enabling better access to asset data. Asset data can thus be better leveraged in a scalable and flexible way irrespective of plant size and remoteness of the user from the asset. The intermediate processing system and process management system may comprise one or more processing and storage devices.

Hence, as explained in this disclosure, the second processing layer may be configured to contextualize process and/or asset specific data. By performing contextualization via the second processing layer, the performance of the first processing layer is not affected. This can also be an advantageous for older plants, as such plants may be retrofitted with a second processing layer by leaving the first processing layer essentially unchanged. Typical core process systems in older plants are built with older generation computer systems to implement plant infrastructure. Such older process systems often do not have the required computing power to perform data intensive tasks. The core processing systems of most industrial plants are seldom upgraded as such systems are highly integrated with several other components of the plants, so a change may require extensive testing to be able to guarantee the performance and safety of the new system. Many plants may thus continue to use systems that may be outdated, or legacy systems, with respect to the recent technology in the market. By adding a separate second processing layer as a further system with higher performance can enable contextualization even for such plants. The present teachings can thus provide a scalable and flexible way of implementing contextualization even in older plants. Additionally, in some cases, the second processing layer, and in cases where an intermediate processing system is implemented, can also enable data contextualization on a plant level rather than an asset level. Data contextualization in the context of this disclosure relates to adding context information to process or asset data or to reducing the data size by pre-processing process or asset specific data. Adding context may include adding further information tag(s) to the process or asset data. Pre-processing may include filtering, aggregating, normalizing, averaging, or inference of process or asset data.

In a further aspect unidirectional or bidirectional communication, e.g. data transfer or data access, may be realized for data streams between different processing layers. One data stream may include process or asset data from the first processing layer being passed to and contextualized via the second processing layer and communicated to the external processing layer. Contextualization may be performed on the second processing layer. In some cases, the contextualization may even be performed on the external processing layer, or even both the second processing layer and the external processing layer. Furthermore, depending on criticality of the process or asset data or the plant specific data such data may be assigned for unidirectional or bidirectional communication. For example, data communication from the second or external processing layers to critical assets may be prohibited by realizing a one-way communication channel. Such communication may only allow for unidirectional communication from the critical asset to the processing layers but not vice versa. Hence, the access to at least some critical assets may be read-only type, e.g., which allows only reading out the asset data, and not sending data to the asset.

The second processing layer as disclosed in the present disclosure can be implemented as process management system. As discussed, the second processing layer may be communicatively coupled to the external processing layer via an external network. The second processing layer may even be configured to manage data transfer to and/or from the external processing layer.

According to an aspect, the external processing layer may be realized at least partially as a computing or cloud environment providing virtualized computing resources, like data storage and computing power. Additionally, in some cases where a plurality of industrial plants operated by different parties are to be monitored and/or controlled, data or process applications influencing the industrial plants may be shared in such cloud environment.

In a further aspect the second processing layer is configured to manage data transfer to and/or from the external processing layer either in real-time or on demand. It will be appreciated that the data transfer is executed via any of the one or more accessibility criterion. Real-time transfer may be buffered depending on network and computing loads on the interface to the external network, or even until the user. On demand transfer may be triggered in a predefined or dynamic manner as agreed from the one or more accessibility criterion.

In a further aspect the second processing layer and/or the external processing layer are configured to exchange data via 3rd party management systems. This may be realized through a secure connection like VPN or via integration of a 3rd party or shared processing layer.

The asset may even be an Internet-of-Things ("IoT") device or system, or even a system comprising one or more IoT devices. More specifically, the asset may be an industrial-Internet-of-Things ("IIoT") device or system, or even a system comprising one or more IIoT devices. For example, the asset may be an IoT sensor or even a Cyber-Physical-System ("CPS"). A CPS in this context encompasses any industrial system that comprises a network of interacting elements. Accordingly, industrial systems such as modern robotic systems and industrial control systems that leverage intelligent mechanisms to establish more close links between the computational and physical elements of such systems fall within the ambit of the term.

Thus, it will follow from the aforementioned that the method may also have the following aspects.

Or more specifically, according to an aspect, the method also comprises:

transmitting, via the interface, the technical context data to the external processing layer.

According to further an aspect, the method also comprises:

receiving, at the second processing layer, one or more selected accessibility criterion wherein the one or more selected accessibility criterion is selected from the technical context data, and selection being performed by the external processing layer.

According to further an aspect, the method also comprises:

receiving, at the external processing layer, the asset data wherein the asset data is transmitted, via the second processing layer, according to the one or more selected accessibility criterion.

According to an aspect, the technical context data is stored as historical technical context data in a memory or database at the user side, for example via the external processing layer. The user or external processing layer may then use historical context data from one or more past access and/or transfers of the asset data for accessing and/or transferring further asset data.

The historical technical context data may even be stored at the external processing layer, and/or, the memory or database may be accessible via the external processing layer.

According to further an aspect, the method also comprises:

storing, via the external processing layer, at least some of the technical context data as historical context data; and receiving, at the second processing layer, one or more pre-selected accessibility criterion wherein the one or more pre-selected accessibility criterion is selected from the historical technical context data, and selection being performed by the external processing layer.

This can further speed up the access and/or transfer process for the asset data. The historical context data may even comprise data related to the availability of the asset and/or other resources in the plant (e.g., processing load, network bandwidth, latency) based on day and/or time. Accordingly, the external processing layer may automatically adapt access and/or transfer for the asset data as per historical availability of the plant resources and/or asset. Thus, despite being isolated from the plant, the user may be able to adapt leveraging the data availability from the asset.

The industrial asset may be any piece of equipment related to the industrial plant, or more simply called, the plant. It will be appreciated that the asset may thus be any device or any single piece of equipment that is capable of generating data that are usable for evaluating the performance of the asset and/or that of the plant. The data are preferably comprising measurement data indicating value of one or more process parameters of the asset and/or the plant, but it may even indicate one or more binary parameters such as state of a valve, or "on" or "off" state of one or more device. The terms "industrial asset" and "asset" are used interchangeably in this disclosure to refer to any single piece or group of plant equipment. As stated, the asset can be any equipment that is capable of generating data that are usable for plant monitoring and/or analysis, preferably in a digital form. As mentioned, the term "asset" may even refer to a group of equipment, for example, a robotic station that comprises a plurality of motors, actuators and sensors. Other non-limiting examples of the asset are, any one or more, or their combination of: heat exchangers, reactors, pumps, pipes, distillation or absorption columns. The asset data may be data generated by the asset or data generated within the asset. For instance, using the same example of a robotic station, the asset data may be data from any one or more of the sensors of the robotic station. The asset data may even be a combined data of a plurality of sensors and/or process parameters, or data from a memory storage or even a controller of the robotic station. Some non-limiting examples of process parameters are, controller setpoints, output signals, settings, historical or logged data and any kind of configuration data.

In newer plant operational technology ("OT") systems, it may be desirable to run one or more computer applications on a cloud computing platform. Such applications may require data from one or more assets of the plant. Accordingly, in some cases it may be required that the asset data be transferred to the cloud platform in order to make the data accessible for the application. It will be appreciated that the external processing layer in such cases may also be implemented in the cloud platform. A problem with older OT systems, particularly PIMS or SCADA, can be a much longer life cycle, leaving the systems being of old/legacy technology in general in such plants. Typically, older OT systems are not designed to provide data in a real-time or near real-time manner. Moreover, such systems often do not have a streaming interface to stream or read the data from. Hence, the only solution for the user or the external processing layer may be to periodically poll data request for receiving new asset data. The applicant has realized that such polling interface can be very inefficient.

The applicant has thus realized a more efficient way of transferring the asset data. In cases where not all the asset data can be provided in real-time or near real-time manner from the system, the second processing layer may be configured for providing or transmitting at least a low-resolution asset data. It will be appreciated that at least this aspect is patentable in its own right, at least due to technical advantages that will be outlined below. In combination with the rest of the features of the present teachings, this can provide further synergistic effects that can at least include an ability to pre-plan transfer of asset data from plants with computational bottlenecks by using technical context data to configure and plan data transfer to the external processing layer or user. This can result in better sequencing of data analytic tasks according to the availability of asset data.

The term "all the asset data" may mean the asset data requested by the external processing layer, or it may be the asset data required by the external processing layer. The situation where not all the asset data can be provided in real-time or near real-time manner may for example be the case when not all requested or required asset data can be retrieved from the asset by the second processing layer in real-time or near real-time manner respectively. Additionally, or alternatively, the situation where not all the asset data can be provided in real-time or near real-time manner may even be the case where a transmission of all the requested or required asset data is not possible in in real-time or near real-time manner respectively. Thus, any computational and/or network bottleneck may be preventing the data transfer in real-time or near real-time manner.

Thus, when viewed from another perspective, there can also be provided a method for preprocessing asset data from an industrial asset located within an industrial plant, the asset being communicatively coupled to a first processing layer, wherein the asset data is provided to a second processing layer via the first processing layer; the first processing layer being communicatively coupled to the second processing layer, and wherein the first processing layer and the second processing layer are configured in a secure network, the method comprising:

providing, via the second processing layer, a low-resolution asset data; wherein the low-resolution asset data is a subset of the asset data requested by an external processing layer, and wherein the low-resolution data is usable by the external processing layer for at least initiating one or more data analyses.

The preprocessing method can either be implemented standalone or in conjunction with the rest of the aspects. Accordingly, an industrial system for preprocessing asset data, as well as a software product for implementing the preprocessing steps can also be provided either as standalone embodiments or in conjunction with the rest of the aspects of the present teachings.

In some cases, the low-resolution asset data may be the lowest resolution portion of the asset data that is usable by the external processing layer, while the rest of the one or more portions of the asset data may be provided at a later time. It will be appreciated that this can have an advantage that the external processing layer does not need to wait for the entire asset data to be available before data processing, such as data analytics, may be started. The external processing layer can thus start processing the lowest resolution portion of the asset data, or coarse asset data, while the rest of the asset data is being received in the background or is to be provided later. Similarly, the low-resolution asset data or coarse asset data may even be a higher resolution data than the lowest resolution portion of the asset data that is usable by the external processing layer. Thus, if a higher resolution data can be provided to the external processing layer than the minimum resolution that is usable, it may be provided while the rest of the required asset data is provided in the background or later. The term provided in the background may for example mean caching or storing remaining one or more portions of asset data at the second processing layer, and/or caching or storing remaining one or more portions of asset data at the external processing layer. The remaining asset data may either be provided in one go or in multiple transfer cycles. Preferably the providing of the remaining asset data is prioritized in one or more data chunks each of which are usable by the external processing layer without the pending asset data that is subsequently pending transfer to the external processing layer. In other words, the asset data is preferably subdivided into data chucks that are usable by the external processing layer without the remaining asset data. It will be appreciated that by doing so the data resolution of the asset data received at the external processing layer can be improved in an incremental and seamless manner without waiting for the rest of the data before proceeding with processing of the data received. The data processing can thus be made more efficient despite limitations in the data transfer speed. The resolution is preferably the time resolution of the asset data.

Most signals from the sensors are time-based signals, accordingly, at least a majority of the asset data is time-series data. One or more techniques may be used for generating the low-resolution asset data, for example, down-sampling one or more signals comprised in the data. A specific technique for generating the low-resolution asset data is not limiting to the scope or generality of the present teachings. Accordingly, any technique that allows generating low-resolution asset data that is usable by the external processing layer can be used for the purpose.

According to an aspect, the asset data transfer and/or access is initiated in response to a variable bulk read history query. This can for example be done by varying the time horizon for the history call from the external processing layer to network interface. By requesting the asset data from a longer time period, the computational resources required to deliver the asset data from the asset and/or a storage unit can be used more efficiently (query time/data points). While this can result in a data transfer comprising older data points, this can reduce the computational load by making the overall transfer more directed to deliver a better resolution for certain portions of the asset data, while still delivering all the other data points or measurements that are not needed with a higher time frequency or resolution.

According to an aspect, the resolution of each asset data portion of the asset data is adapted according to a computed relevance value for the data analytics which requires the asset data. According to a further aspect, a machine learning ("ML") model trained with asset data with a time horizon of around two years, and hourly averages of the data points of the asset data is used for determining the data points of the asset data that are required to be delivered with high resolution, and the remaining data points are only required with lower resolution. Similarly, dependent upon the asset, the machine learning ("ML") model may be trained with asset data with a time horizon of around one year, and hourly, or half hourly averages, or quarterly average of the data points of the asset data. More generally, the machine learning ("ML") model may be trained with asset data with a time horizon of more than 6 months, and a data points average of maximum 1 day for the asset data.

An advantage of doing so can be that despite the asset data portion for the most recent hours is not available at the external processing layer, the lower resolution data from the long-term history of the asset data can be used to augment for the purpose of analytics.

According to a further aspect, the asset data usage is monitored for categorizing the relevance of specific data points according to specific usage scenario. The monitoring may be done via the second processing layer, or via the third processing layer. By doing so resolution of specific data portions may be determined as relevant for the specific usage scenario. By adapting the resolution of data points of the asset data the data transfer can be made further efficient. This may be achieved, for example, by monitoring the technical context of the request as at least one boundary condition and computing a cost function for how the requested asset data should be delivered, for example, to the external processing layer. Further, an optimization algorithm may be applied to parameterize the data polling at the second processing layer. According to an aspect, the data usage is monitored essentially continuously or regularly, and the weights of the cost function are adapted. The optimization can be rerun for a different asset and/or a different external processing layer.

In the present context, the terms, especially the term near real-time may refer to a signal or data those comprise a time-delay between the generation of the signal/data, to a transmission of that signal/data of no more than 15 s, specifically of no more than 10 s, more specifically of no more than 5 s. Thus, as an example, an asset dataset that is provided at the network interface for transmission to the external processing layer within 15 s of the generation of that asset dataset at a plant asset can be considered a near real-time transmission, or as being provided in near real-time manner. Similarly, transmissions with smaller time-delays may be termed real-time transmissions.

With regards to the technical context data, the rules may, for example, be any one or their combination of, time or time period at or around which an access and/or transmission of the asset data can be granted, network path via which the access and/or transmit of the data can be granted.

The parameters may be any one or more of, data transfer rate, number of data packets, size of dataset of the asset data for which access and/or transfer is requested, size of one or more data packets that combine to the asset data for which access and/or transfer is requested, resolution of the one or more data packets.

It will be understood that the secure network is a network or a part thereof which is used for communication between at least some of the plant assets that are used in plant operation. The secure network thus can be an intranet belonging to the plant. Usually the secure network is typically located within the industrial plant, but it can sometimes even extend beyond the physical location of the plant. For example, if any one or more or plant related databases, processing systems, or other computational services are implemented as one or more cloud-based services. The first processing layer and the second processing layer are a part of the secure network. The secure network may even be a segregated network including more than two security zones separated by firewalls. Such firewalls may be network or host-based virtual or physical firewalls. The firewall may be hardware- or software-based to control incoming and outgoing network traffic. Here pre-determined rules in the sense of a white listing may define allowed traffic via access management or other configuration settings. Depending on the firewall configuration the security zones may adhere to different security standards.

The external network may either be at least partially be a public network such as internet. Alternatively, or in addition, the external network may at least partially be another secure network isolated from the secure network within with the second processing layer is provided. It will be appreciated that in certain cases, for example, when two plants are interconnected via a dedicated private or non-public network, the secure network of the plant may be isolated from the internal network of the other plant. Accordingly, a user located in the other plant may still face at least some of the same problems in accessing the asset data from the plant, for example, the user being unaware of the operational parameters of the plant. The present teachings can thus also be applied to solve similar problems in a group of plants that are interconnected by any kind of external network, public or private.

In a further aspect the first processing layer is configured in a first security zone via a first firewall and the second processing layer is configured in a second security zone via a second firewall. To securely protect the first processing layer, the first security level may adhere to a higher security standard than the second security level. Security levels may adhere to a common industry standard such as lined out in Namur documentation IEC 62443. The second processing layer may provide further segregation via security zones. For example, the intermediate processing system may be configured in a third security zone via a third firewall and the process management system may be configured in the second security zone via the second firewall. The third and second security zones may be staggered in security standard as well. For example, the third security zone may adhere to a higher security standard than the second security zone. This allows for higher security standards on the lower security zone of the first processing layer and lower security standards on higher security zones of the second processing layer.

According to an aspect, the technical context data is generated using a machine learning ("ML") model, e.g., a trainable neural network, that has been trained using historical access and/or transfer data related to the asset. For example, the training data may comprise historical latency and performance data related to the asset. The training data may comprise specific latency and performance data dependent upon a plurality of possible network paths for transmitting the asset data from the asset until the external database or destination memory where the asset data is to be integrated. Alternatively, or in addition, the training data may even comprise historical technical context data from one or more past access and/or transfers of the asset data. Alternatively, or in addition, the training data may even comprise data from one or more historical partial requests that were used for determining at least one iterative parameter. The ML model may be executed at least partially on the second processing layer, and/or on the intermediate processing layer. The ML model may even be partially executed on the external processing layer. The ML model can even be used to determine at least one bottleneck, and/or learn properties of at least bottleneck in at least one of the network paths between the asset and the external processing layer or the user. Accordingly, the ML model can also be used to determine at least one property of at least one bottleneck. The term "bottleneck" may refer to any kind of limitation in a computational resource which is required to provide access and/or transfer of the asset data to the user. Accordingly, the bottleneck may be a limitation in the network path, for example, data bandwidth and/or latency. Alternatively, the bottleneck may even be a processing load limitation of any processing layer or any processor via which the asset data is required to be processed. Further alternatively, the bottleneck may even refer to a memory limitation or limited data storage capacity, for example limited random-access-memory ("RAM") or cache.

It will be appreciated that using a ML model trained as specified above, can further enable determining the bottlenecks in accessing and/or transferring the asset data. Hence, the ML model can be used for resolving data integration parameters between the user or the external processing layer and the asset by using the ML model as an intermediary.

According to another aspect, the training data is divided into: an internal training data which comprise the latency and performance data related to one or more possible internal network paths for transmitting the asset data until the interface to the external network; and an external training data which comprise the latency and performance data related to one or more possible external network paths for transmitting the asset data from the interface until the external processing layer. Preferably the external training data comprises the latency and performance data until the external database or destination memory where the asset data is to be integrated. In some cases, the external training data may even be related to one or more partial paths between the interface and until the external database or destination memory. This may, for example, be the case when the external training data is not fully populated or available. An advantage of splitting the training data into internal training data and external training data is that flexibility can be increased in training for the paths that have changed. For example, if one or more external paths have changed, training can only be done for the external path. This can also save training time and allow faster data integration. Similarly, the machine learning ("ML") model can even be split into an internal ML model and an external ML model. The internal ML model may be trained by using the internal training data, whereas the external ML model may be trained using the external training data.

Another synergistic effect of dividing the training data into internal and external training data can be that the second processing layer can more flexibly determine a combination of an internal path and an external path which provides a favorable accessibility criterion for the external processing layer. One or more of such combinations may thus be provided to the external processing layer as a part of the technical context data. The external processing layer can thus request access of the asset data using the most suitable accessibility criterion.

The applicant has further realized that the present teachings can be particularly suitable for application in a value chain or even in serial production where an asset, or product, which is produced by a first plant is used by a second plant. Those skilled in the art will appreciate that the number of plants in the value chain can be more than two. Or more generally, a user may be a supplier for another user downstream of the value chain, and so forth.

Industrial plants, or simply plants, comprise infrastructure that is used for an industrial purpose. The industrial purpose may be manufacturing of one or more products, i.e., process manufacturing done by a process plant. The product can, for example, be any product, such as a: chemical, biological, pharmaceutical, food, beverage, textile, metal, plastic, semiconductor. Accordingly, the plant can be any or more of the: chemical plant, pharmaceutical plant, fossil fuel facility such as oil and/or natural gas well, refinery, petrochemical plant, cracking plant, fracking facility, and such. Those skilled in the art will appreciate that the plant also comprises assets in the form of instrumentation that can include several different types of sensors for monitoring the plant parameters and equipment. Accordingly, some of the asset data may generated via the instrumentation such as sensors.

When viewed from yet another perspective there can also be provided a system for managing asset data of an industrial asset, the system comprising at least one processor, wherein any of the at least one processor is configured to execute any of the method steps herein disclosed.

More specifically, there can be provided an industrial plant system comprising a first processing layer and a second processing layer, the first processing layer being communicatively coupled to the second processing layer, and the first processing layer and the second processing layer being configured in a secure network, wherein at least one industrial asset is configured to communicatively couple to the first processing layer, wherein the asset is configured to provide asset data to the second processing layer via the first processing layer, the system further comprising an interface to an external network, wherein the second processing layer is configured to:
    generate technical context data related to the asset; and
    provide the technical context data to the interface;
    wherein the technical context data comprises one or more accessibility criterion for the asset data; the accessibility criterion comprising one or more rules and/or parameters compliable by an external processing layer for receiving the asset data.

The system is hence suitable for integrating asset data from the industrial asset.

When viewed from another perspective, there can also be provided a computer program comprising instructions which, when the program is executed by a suitable computer processor, cause the processor to carry out the method steps herein disclosed. There can also be provided a non-transitory computer readable medium storing a program causing a suitable computer processor to execute any method steps herein disclosed.

A computer-readable data medium or carrier includes any suitable data storage device on which is stored one or more sets of instructions (e.g., software) embodying any one or more of the methodologies or functions described herein. The instructions may also reside, completely or at least partially, within the main memory and/or within the processor during execution thereof by the computer system, main memory, and processing device, which may constitute computer-readable storage media. The instructions may further be transmitted or received over a network via a network interface device.

The network discussed herein may be any kind of data transmission medium, wired, wireless, or their combination. A specific kind of network is not limiting to the scope or generality of the present teachings.

The computer program for implementing one or more of the embodiments described herein may be stored and/or distributed on a suitable medium, such as an optical storage medium or a solid state medium supplied together with or as part of other hardware, but may also be distributed in other forms, such as via the internet or other wired or wireless telecommunication systems. However, the computer program may also be presented over a network like the World Wide Web and can be downloaded into the working memory of a data processor from such a network.

When viewed from another perspective, a data carrier or a data storage medium for making a computer program element available for downloading can be also provided, which computer program element is arranged to perform a method according to one of the previously described embodiments.

The word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

Example embodiments are described hereinafter with reference to the accompanying drawings.

DETAILED DESCRIPTION

Figure 1:
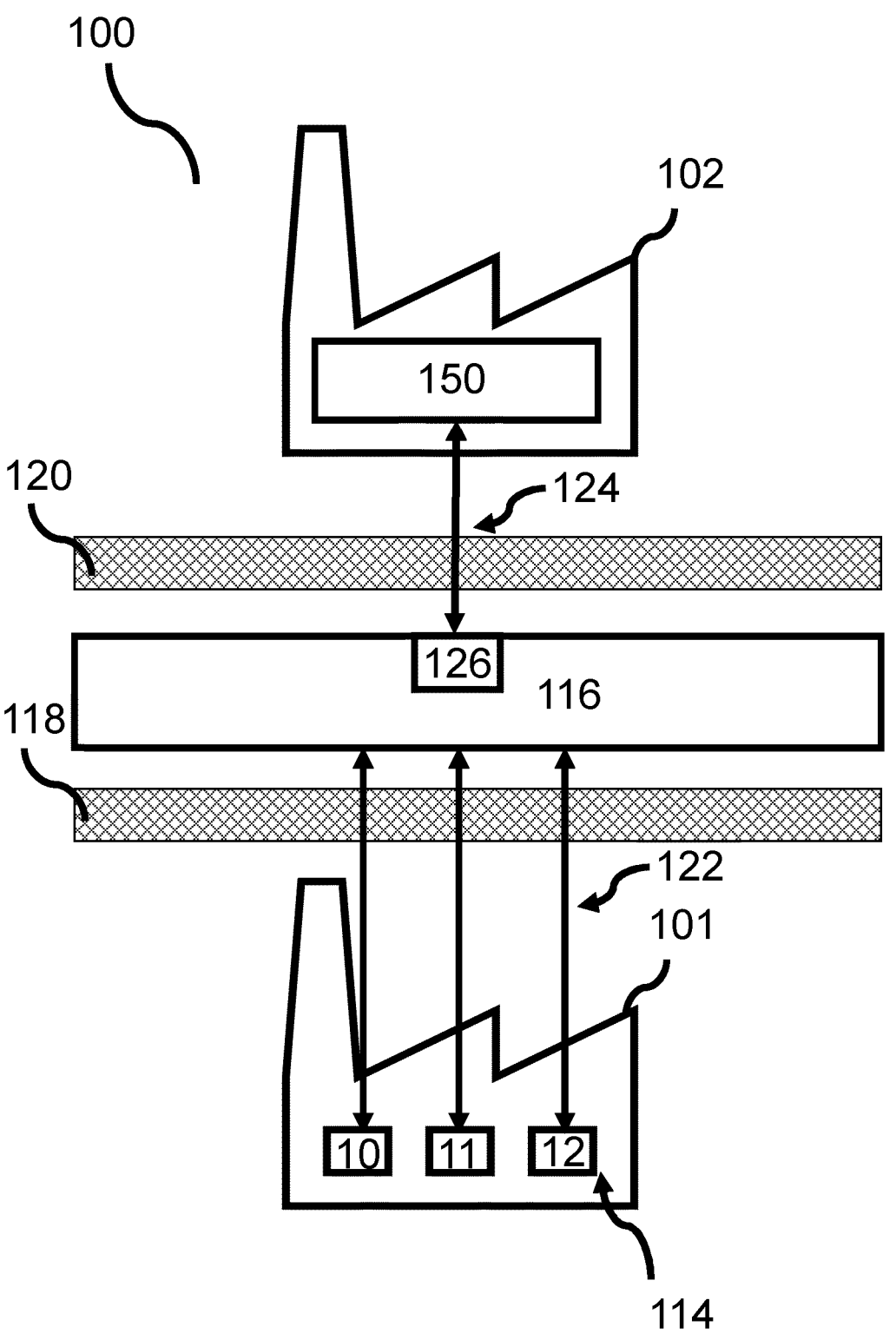
FIG. 1 shows a block-diagram of a system comprising processing layers

In industrial plants such as chemical plants, process industrial production typically starts with upstream products, which are used to derive further downstream products. In typical plants or their arrangement, the value chain production via one or more intermediate products to an end-product is highly restrictive and based on siloed infrastructure. This can hamper introduction of new technologies such as IoT, cloud computing and big data analytics.

Unlike other manufacturing industries, process industry may be subject to very high standards in particular with regard to availability and security. For this reason, computing infrastructures are typically high security, e.g., unidirectional and siloed, with highly restrictive access to monitoring and control systems of such plants.

In general, such industrial plants are embedded in an enterprise architecture in a siloed way with different levels to make a functional separation between operational technology and information technology solutions.

Level 0 relates to the physical processes and defines the actual physical processes in the plant. Level 1 relates to intelligent devices for sensing and manipulating the physical processes, e.g. via process sensors, analyzers, actuators and related instrumentation. Level 2 relates to control systems for supervising, monitoring and controlling the physical processes. Real-time controls and software; DCS, human-machine interface ("HMI"); supervisory and data acquisition ("SCADA") software are some of the typical components. Level 3 relates to manufacturing operations systems for managing production workflow to produce the desired products. Batch management; manufacturing execution/operations management systems (MES/MOMS); laboratory, maintenance and plant performance management systems, data historians and related middleware are typical components. Time frames for controlling and monitoring may be shifts, hours, minutes, seconds. Level 4 relates to business logistics systems for managing the business-related activities of the manufacturing operation. Enterprise resource planning ("ERP") is usually the primary system and establishes the basic plant production schedule, material use, shipping and inventory levels. Time frame may be months, weeks, days, shifts.

Additionally, such structures may adhere to strict one-way communication protocols allowing for no data flow into level 2 or below. Not covered in such architectures is the company or enterprise-external internet. This model remains, however, an essential concept within the realm of Cyber Security. Within this context, the challenge can to leverage the benefits of Cloud computing and Big Data, while still guaranteeing the established advantages of existing architectures: i.e. the high availability and reliability of the lower levels system (Level 1 and Level 2), that control the chemical plant, as well as the cyber security.

The present teachings can allow for enhancing monitoring and/or control by altering this framework in a systematic way, to introduce new capabilities that are compatible with existing architectures. The present disclosure can provide a scalable, flexible and available computing infrastructure for process industry, which at the same time adheres to the high security standards. Furthermore, leveraging data and analytics between separate plants can be enabled while ensuring that the performance of a plant is not unduly affected as a result of an externally requested access and/or transfer of data from an asset that is located within the plant.

FIG. 1 shows a system 100 or an arrangement comprising processing layers. A first industrial plant 101 is shown, which can, for example, be a chemical plant. The chemical plant can be any manufacturing facility based on chemical processes, e.g. transforming a feedstock to a product using chemical processes. The system 100 is shown comprising two processing layers including the first processing layer in the form of a core process system 114 associated with the plant 101, and a second processing layer 116, that can, for example, be in the form of a process management system, associated with the plant 101. The first processing layer 114, or the core process system, is communicatively coupled to the second processing layer 116 allowing for a unidirectional or a bidirectional data transfer. The core process system 114 comprises a decentralized set of processing units associated with assets of the chemical plant 101.

The first processing layer 114 and the second processing layer 116 are configured in the secure network which in the schematic representation is shown in this example as two security zones delimited by firewalls 118 and 120. The first security zone is situated on the core process system 114 level, where a first firewall 118 controls incoming and outgoing network traffic to and from the core process system 114. The second security zone is situated around the second processing layer 116, where a second firewall 120 controls incoming and outgoing network traffic to and from the second processing layer 116. Such segregated network architecture can allow shielding vulnerable plant operations from unauthorized access or cyberattacks.

The first processing layer 114 provides asset data 122 of the plant 101 to the second processing layer 116. The first processing layer 114 may also provide process or asset specific data of the plant 101 to the second processing layer 116. The process or asset specific data may include value, quality, time, measurement unit, asset identifier. Via contextualization further context such as plant identifier, plant type, reliability indicator, or alarm limits for the plant may be added. The second processing layer 116 is further configured to provide technical context data to the interface 126 to an external network 124.

The technical context data comprises one or more accessibility criterion for the asset data. The accessibility criterion comprises one or more rules and/or parameters that should be complied by an external processing layer 150 for receiving the asset data. The external processing layer 150 may be located within a second plant 102. Although processing layers or security zones associated with the second plant 102 are not shown in the figure, the second plant 102 may have a similar setup of layers as associated with the first plant 101. Alternatively, the second plant 102 may have a different processing arrangement as compared to the first plant 101. Since a user located in the second plant 102 may not have a complete overview of the critical operating parameters in the first plant 101, a request of data from an asset, for example asset 12, may affect the performance or safety within the first plant 101. In some cases, the user may be an application running on the external processing layer 150. The external processing layer 150 may even be a part of a cloud computing platform or service. Accordingly, it is not essential that the external processing layer 150 is located in the second plant 102. In some cases, the external processing layer 150 may even be unrelated to any plant, unlike as shown in FIG. 1 where the external processing layer 150 relates to the second plant 102. The external processing layer 150 may even be a separate remote computing service for the purpose of analyzing asset data from one or more plants.

The second processing layer 116 is communicatively coupled to the external processing layer 150 via the interface 126 to the external network. In some cases, the external processing layer 150 may even be a computing or cloud environment providing virtualized computing resources, like data storage and computing power.

The one or more rules and/or parameters, included in the accessibility criterion, may be automatically specified or they may be selected such that an access and/or transfer of the asset data to the external processing layer 150 performed in compliance with said one or more rules and/or parameters does not affect any critical operation of the plant 101 and/or any of the assets 10-12.

For example, for analyzing vibration on a pump 11, the user, via the external processing layer 150 may have requested measurement data from the pump 11. The measurement data may have a frequency, for example, of 10 kHz. It may be so that due to a latency in the network, such a data transfer may not be possible in real-time. By applying the technical context data, which may include a priori determined parameters rather than accommodating the user request right away and thereby potentially affecting the performance of the plant 101 and/or the asset 11 without being able to transmit desired data, it can be provided to the user a one or more viable alternatives for accessing/transferring the asset 11 data. In some cases, the technical context data may be generated using a machine learning ("ML") model. The system, e.g., via the second processing layer 116 may then learn when it may be possible to achieve such a transfer rate. Additionally, or alternatively, it may be suggested an alternate path via which an access and/or transfer with the requested characteristics may be possible. In some cases, it may be provided to the user a possibility to run analytics or applications locally, e.g., on the second processing layer 116, and thus providing the results to the external processing layer 150. Accordingly, the second processing layer 116 and/or the external processing layer 150 may be configured to host and/or orchestrate process applications or analytics. In some cases, the second processing layer 116 may host and/or orchestrate process applications relating to core plant operations and the external processing layer may be configured to host and/or orchestrate process applications relating to non-core plant operations. Here the core plant operations may correspond to a critical operations allowing the plant 101 to run in island mode without external network connection.

The data from the pump 11, or the asset data, may even be provided in multiple data packages delivered at different times. The data packages may be cached at the second processing layer, and/or the intermediate processing layer, and/or the external processing layer. In some cases, the asset data may be provided initially in a low-resolution form, or coarse form, to the external processing layer such that the data processing may be initiated rather than waiting for the complete asset data to be available at the external processing layer. The remaining asset data may be provided in one or more data packages, each data package incrementally improving the resolution of asset data at the external processing layer. In some cases, the data packages may even have different resolution from each another, dependent upon the relevance of the asset data, or pump data, for the analytics for which the data is required.

In some cases, one or more additional processing layers are also possible, either on the first plant 101 side, or on the second plant 102 side, or both. For example, an intermediate processing layer may be provided between the first processing layer 114 and the second processing layer 116. The intermediate processing layer may be communicatively coupled to the first processing layer 114 via the first firewall 118. Thus, the first processing layer 114 and the second processing layer 116 are communicatively coupled via the intermediate processing layer. An additional firewall can also be provided between the intermediate processing layer and the second processing layer 116. The intermediate processing layer can even allow for more enhanced data handling by reducing data transfer rates to the external processing layer 150, e.g., via pre-processing and enhancing data quality by contextualization.

In some cases, the ML model may at least partially be executed on the intermediate processing layer.

Figure 2:
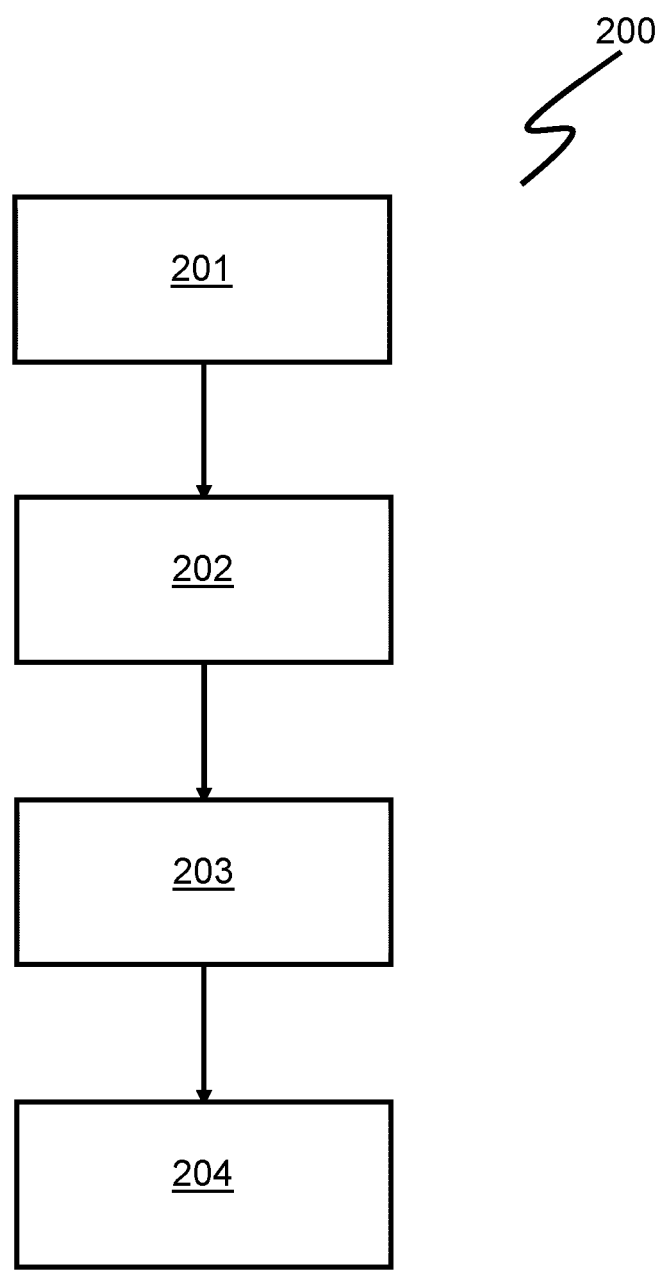
FIG. 2 shows a flowchart of an aspect

FIG. 2 shows a flowchart 200 of an aspect of the present teachings. The technical context data related to the asset, for example, pump 11, is generated 201, for example at the second processing layer 116. The technical context data is provided 202, for example via the second processing layer 116, to the interface 126. The interface 126 connects to the external network 124. The technical context data can thus be provided 203 to the external processing layer 150 which requires an access and/or transfer of the data from the pump 11, or the asset data. The technical context data can be provided by transmitting via the network interface 126. The technical context data comprises one or more accessibility criterion for the asset data. The accessibility criterion comprises one or more rules and/or parameters compliable by an external processing layer 150 for the access and/or transfer of pump data or asset data. Optionally. the asset data can be received 204 at the external processing layer 150 according to one or more selected accessibility criterion which is/are selected by the external processing layer 150 from the technical context data. Further optionally, in addition to the steps 201-204 discussed here, further aspects such as generating the technical context data from at least one iterative parameter can be also implemented.

Various examples have been disclosed above for a method for integrating asset data, provided a system for managing asset data, and a computer software product implementing any of the relevant method steps herein disclosed. Those skilled in the art will understand however that changes and modifications may be made to those examples without departing from the spirit and scope of the accompanying claims and their equivalents. It will further be appreciated that aspects from the method and product embodiments discussed herein may be freely combined. Certain example embodiments of the present teachings are summarized in the following clauses.

The invention claimed is:

1. A method for integrating asset data from an industrial asset located within an industrial plant, the asset being communicatively coupled to a first processing layer, wherein the asset data is provided to a second processing layer via the first processing layer, the first processing layer being communicatively coupled to the second processing layer, and wherein the first processing layer and the second processing layer are configured in a secure network comprising at least two security zones delimited by firewalls, the method comprising:

generating, at the second processing layer, technical context data related to the asset; and providing, via the second processing layer, the technical context data to an interface to an external network, wherein the technical context data comprises at least one accessibility criterion for the asset data, the accessibility criterion comprising at least one rule and/or parameter compliable by an external processing layer for receiving the asset data;

generating, via the second processing layer, at least a first partial request for accessing the asset data;

measuring at least a first response to the first partial request, the first response being indicative of the impact of the first partial request on at least one computational and/or network resource; and determining, dependent upon the first response, at least a first iterative parameter, wherein the technical context data is at least partially generated using the first iterative parameter.

2. The method according to claim 1, wherein the technical context data is at least partially generated using at least one of the: a priori determined parameters including asset network address, asset CPU load, asset memory such as Random Access Memory ("RAM"), and network path between the industrial asset and the external processing layer.

3. The method according to claim 1, wherein the method further comprises:

generating dependent upon the response, via the second processing layer, a second partial request for accessing the asset data; wherein the second partial request is more resource-demanding than the first partial request;

measuring a second response to the second partial request; the second response being indicative of the impact of the second partial request on the at least one computational and/or network resource; and determining, dependent upon the first response and/or the second response, the at least first and/or a second iterative parameter.

4. The method according to claim 1, wherein the method further comprises:

transmitting, via the interface, the technical context data to the external processing layer.

5. The method according to claim 1, wherein the method further comprises:

receiving, at the second processing layer, at least one selected accessibility criterion, wherein the at least one selected accessibility criterion is selected from the technical context data, and selection being performed by the external processing layer.

6. The method according to claim 1, wherein the method further comprises:

receiving, at the external processing layer, the asset data, wherein the asset data is transmitted, via the second processing layer, according to the at least one selected accessibility criterion.

7. The method according to claim 1, wherein the method further comprises:

storing, via the external processing layer, at least some of the technical context data as historical context data; and receiving, at the second processing layer, at least one pre-selected accessibility criterion, wherein the at least one pre-selected accessibility criterion is selected from the historical technical context data, and selection being performed by the external processing layer.

8. The method according to claim 1, wherein the method further comprises:

receiving, at the external processing layer, low-resolution asset data, wherein the low-resolution asset data is a subset of the asset data requested by the external processing layer, and wherein the low-resolution data is usable by the external processing layer at least for initiating at least one data analysis.

9. The method according to claim 8, wherein the method further comprises:

receiving, at the external processing layer, a second low-resolution asset data, wherein the second low-resolution asset data is a subset of the asset data requested by the external processing layer, and wherein the second low-resolution asset data is usable by the external processing layer in combination with the low-resolution asset data for at least further processing the at least one data analysis.

10. The method according to claim 9, wherein the low-resolution asset data and the second low-resolution data have different resolutions from each another.

11. The method according to claim 1, wherein the technical context data is generated using a machine learning ("ML") model, e.g., a trainable neural network, which has been trained using historical access and/or transfer data related to the asset, and/or data from at least one historical partial request being used for determining the at least first and/or a second iterative parameter.

12. A non-transitory computer readable medium having instructions stored thereon which, when executed by a suitable computer processor, cause the processor to carry out the method of claim 1.

13. The method according to claim 1, wherein a first security zone of the at least two security zones is situated on the first processing layer, and wherein a second security zone of the at least two security zones is situated around the second processing layer.

14. An industrial plant system comprising:

a first processing layer and a second processing layer, the first processing layer being communicatively coupled to the second processing layer, and the first processing layer and the second processing layer being configured in a secure network comprising at least two security zones delimited by firewalls, wherein at least one industrial asset is configured to communicatively couple to the first processing layer, wherein the asset is configured to provide asset data to the second processing layer via the first processing layer, the plant control system further comprising an interface to an external network, wherein the second processing layer is configured to:

generate technical context data related to the asset; and provide the technical context data to the interface, wherein the technical context data comprises at least one accessibility criterion for the asset data, the accessibility criterion comprising at least one rule and/or parameter compliable by an external processing layer for receiving the asset data;

generate at least a first partial request for accessing the asset data;

measure at least a first response to the first partial request, the first response being indicative of the impact of the first partial request on at least one computational and/or network resource; and determine, dependent upon the first response, at least a first iterative parameter, wherein the technical context data is at least partially generated using the first iterative parameter.

* * * * *